Figure 1:
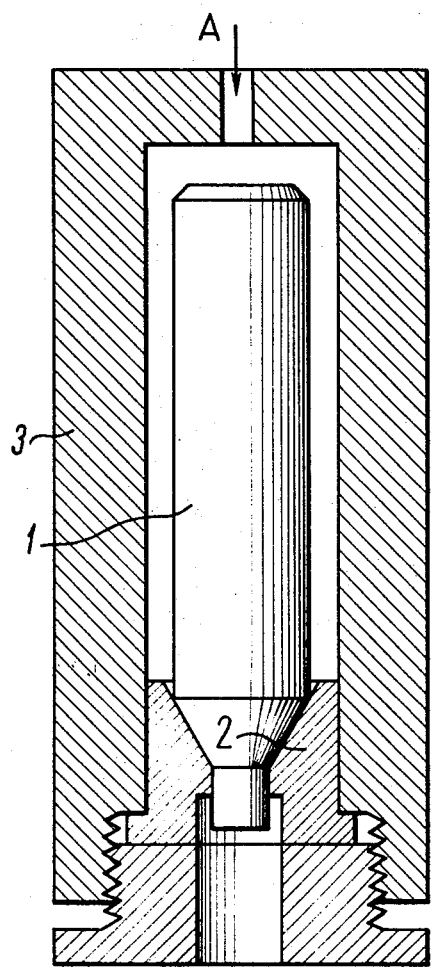

United States Patent

[11] 3,580,019

[72] Inventors Boris Ivanovich Beresnev
ul Krasnoprudnaya 7/9, kv.31;
Evgeny Dmitrievich Martynov, MGU sektor 1, kv. 13; Jury Nikolaevich Ryabinin, Vorobievskoe shosse 2, kv. 40; Mikhail Vasilievich Maltsev, ul Streletskaya 26-a kv. 40; Georgy Pavlovich Britnev, ul Lobachika 10, kv. 4; Anatoly Vasilievich Kocherov, 3 Pavlovsky per., 13, kv. 2, Moscow; Dmitry Konstantinovich Bulychev, ul Kuibysheva,123-B, kv. 24, Sverdlovsk; Kuzma Petrovich Bodionov, ul Malysheva 135,Kv.1, Sverdlovsk, U.S.S.R.
[21] Appl. No. 637,450
[22] Filed May 10, 1967
[45] Patented May 25, 1971

[54] METHOD OF MANUFACTURING ROD, SHAPED AND TUBULAR PRODUCTS FROM DIFFICULT-TO-WORK METALS AND ALLOYS, PREFERABLY HIGH MELTING-POINT AND CHEMICALLY ACTIVE ONES
7 Claims, 2 Drawing Figs.
[52] U.S. Cl. .................................................. 72/47,
72/41, 72/258, 72/710, 117/71
[51] Int. Cl. ....................................................... B21c 23/24
[50] Field of Search............................................ 72/258, 46, 47, 41, 42; 207/10.1, 10.3; 29/424; 75/20; 117/71 (M)(X)

[56] References Cited
UNITED STATES PATENTS

| | | | |
|---|---|---|---|
| 3,339,271 | 9/1967 | Durfee et al. .................. | 72/47 |
| 535,587 | 3/1895 | Hiles .............................. | 72/42 |
| 3,135,623 | 6/1964 | Altwicker....................... | 117/53 |
| 2,169,444 | 8/1939 | Dahlberg........................ | 72/42 |
| 3,344,507 | 10/1967 | Green............................. | 29/420.5 |
| 3,397,562 | 8/1968 | Fuchs, Jr. ...................... | 72/54 |

FOREIGN PATENTS

| | | | |
|---|---|---|---|
| 230,117 | 3/1925 | Great Britain............... | |
| 751,260 | 6/1956 | Great Britain............... | |

Primary Examiner—Charles W. Lanham
Assistant Examiner—A. L. Havis
Attorney—Holman and Stern ABSTRACT: A method of extruding materials that are difficult to extrude in which a blank of the material is enclosed in a container with a portion extending into an extrusion die and the blank is subjected to high pressure fluid to press the blank through the blank may be coated with a metal or metals such as nickel and copper, and a a lubricant applied thereto. The outer coating of a blank coated with plural layers of metal may be porous.

Patented May 25, 1971  3,580,019

METHOD OF MANUFACTURING ROD, SHAPED AND TUBULAR PRODUCTS FROM DIFFICULT-TO-WORK METALS AND ALLOYS, PREFERABLY HIGH MELTING-POINT AND CHEMICALLY ACTIVE ONES

The present invention relates to methods of manufacturing extruded products, and more specifically to methods of manufacturing rod, shaped and tubular products from difficult-to-work metals and alloys, preferably high melting-point and chemically active metals and alloys.

Known at present is a method of manufacturing, extruded products by depositing a metal coating up on a blank, followed by the extrusion thereof through a die under the action of a high-pressure fluid.

This method, however, is suitable only for relatively plastic metals. When manufacturing products of difficult-to-work, high melting-point and chemically active metals and alloys, the required hydrostatic pressure is so high that it causes a failure of the equipment. The high-pressure fluid also penetrates into the pores of said materials (especially those manufactured by a metallo-ceramic method) and causes their breakage.

An object of the present invention is to provide a method of manufacturing rod, shaped and tubular products, which permits the manufacture of said products from difficult-to-work, high melting-point, chemically active metals and alloys by decreasing the additional stress due to large frictional forces established during the deformation, and by protecting the material of a blank against the penetration of high-pressure fluid into its pores, which is conductive to the failure of the blank.

According to the above and other objects, the proposed method of manufacturing rod, shaped and tubular products from difficult-to-work metals and alloys, especially high melting-point and chemically active ones, comprises depositing a metal coating upon a blank followed by the extrusion thereof through a die under the action of a high-pressure fluid, the metal coating being deposited in a plurality of layers, with the outermost layer being porous.

It is expedient that the coating layers are composed of various metals, for instance, nickel and copper, which firmly adhere to each other and to the surface of the blank.

A preferably pasty lubricant which does not dissolve in the high-pressure fluid may be deposited upon the metal coating.

When manufacturing thin-walled tubular products, the extrusion of the blank through a die is effected on a movable mandrel provided with a centering head.

Figure 2:
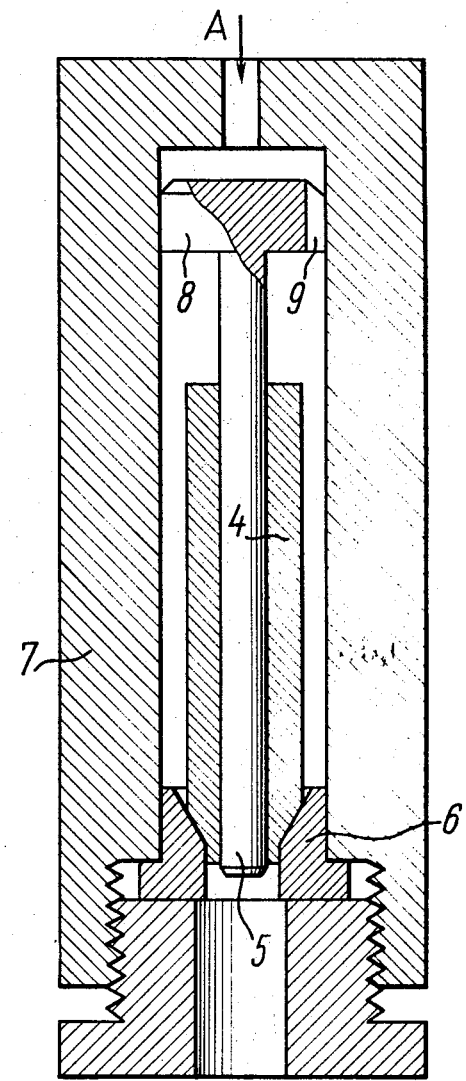

Other objects and advantages of the present invention will become more fully apparent from a consideration of the following description thereof, taken in conjunction with the appended drawings, in which:

FIG. 1 shows a device of the present invention for accomplishing the method of manufacturing rod products; and FIG. 2 shows a device for accomplishing the method of manufacturing thin-walled tubular products according to the present invention.

The proposed method is based upon a principle of utilizing to advantage the effect of increasing plasticity of materials, subjected to compression on all sides.

It has been experimentally proven that under the action of on all sides compression the plasticity of most materials (including fragile, high melting-point, chemically active metals and alloys) increases markedly. In this connection, the higher the pressure applied, the more plastic the material becomes. In the application of a fairly high pressure on all sides of the material (of the order of a value of yield strength under the action of shear force and even higher) the fragile metals and alloys become capable of sustaining considerable plastic deformation in a cold state without failure. The fragile metal, when strained under a pressure, obtains thereby a finely crystalline structure; and, as a result, the metal remains plastic even after the pressure is relieved, while its strength is considerably increased.

Rod and shaped products are manufactured by extruding a blank 1 (FIG. 1) through a die 2 under the action of a high-pressure fluid, with the pressure thereon being applied in a container 3.

To prevent the high-pressure fluid from penetrating into the pores of the blank material, the blank, is to be coated with metal before extruding. This coating markedly decreases the fluid pressure, as required for extruding the blank through a die.

The metal coating is deposited on the blank in a plurality of layers, which results in the provision of a firm and dense coating that does not separate from the blank during its deformation and does not permit the high-pressure fluid to penetrate into its surface. The upper or outer layer of the coating is made porous, which ensures the adsorption of the working fluid by its surface, thereby resulting in a decrease of frictional forces between the surfaces of the blank and die.

The surface of the blank may be coated by any existing method, for example, electroplating.

The coating layers are composed of a plurality of metals, firmly adhering to each other and to the blank surface. Thus for example, if the coating is composed of two metals, say, nickel and copper, then its multiple-layer structure is obtained owing to the alternation of layers of these metals.

For decreasing the extrusion force to be applied on the blank, a pasty lubricant does not dissolve in the high-pressure fluid and does not decompose when heated to a temperature of 400° C., is deposited on the metal coating.

When extruding the blank without any metal coating, the pasty lubricant is deposited directly upon the blank surface. This also reduces the extrusion force and markedly improves the cleanness of the surface of the products obtained.

A mixture of mineral oil, fatty acid and disulfides or diselenides of high melting-point metals, for example tungsten or molybdenum, may be employed as the pasty lubricant.

For manufacturing thin-walled tubular products, the surface of a tubular blank is prepared by the above-described method. Then, a tubular blank 4 (FIG. 2) is force-fitted on a mandrel 5, inserted with its protruding part into a die 6 and, together with the die, placed in a container 7. Between the internal surface of the container 7 and the blank 4 a gap is formed for permitting the high-pressure fluid contact the lateral surface of the blank.

Then the fluid producing the force or pressure in internal cavity a pressure is forced into the container 7 through hole A under the action of which the extrusion of the blank 4 is effected together with movement of the mandrel 5 through the die 6.

To prevent distortions of the blank 4 during extrusion, the mandrel 5 is employed that is provided with a guiding head 8 having axial channels 9 for passing fluid and establishing the hydrostatic pressure to be applied on the blank 4.

The extrusion of the products is effected at temperatures not exceeding those of recrystallization of the material being extruded.

Preheating is desirable with a view to decreasing the extrusion force, protecting the material to be extruded against oxidation and being saturated by harmful gaseous impurities, as well as for improving the quality of the product surface.

The proposed method permits the manufacture of shaped, tubular, and rod products from difficult-to-work, high melting-point, chemically active metals and alloys, for instance, molybdenum, chromium, tungsten, beryllium, including materials that do not respond to working by hot pressing, with the products being obtained with high degrees (more than 90 percent) of plastic deformation per pressing cycle. The materials being pressed obtain a finely crystalline structure, while the products thus manufactured possess an increased mechanical strength and impact value, a higher precision of dimensions and a high quality of surface.

The products treated by this method acquire plasticity permitting their further deformation by the usual pressing methods.

In describing said variant of the embodiment of the present invention, for purposes of clarity there has been employed a concise terminology pertaining to this field. The invention, however, is not limited by the adopted terms; and it is necessary to take into consideration that each said term covers all the equivalent members, operating under similar conditions and employed for solving the same problems.

Though the present invention is described in connection with its preferred embodiment, it is evident that modifications may be made therein so long as such modifications do not depart from the idea and scope of the invention, which will be readily understood by those skilled in the art.

These modifications are considered to be such that they do not deviate from the true spirit and scope of the invention, as defined by the appended claims.

We claim:

1. A method of manufacturing extruded products from difficult-to-work metals and alloys such as high melting-point and chemically active materials, comprising the steps of depositing a metal coating upon a blank of the material to be extruded in a plurality of layers, making the outermost layer porous, positioning the thus coated blank in a container, and introducing a high-pressure fluid into the container to extrude the thus treated blank through a die operably related to the container, with the coating preventing the high-pressure fluid from entering the pores of the blank material and the outermost porous layer assuring absorption of the high-pressure fluid for decreasing the frictional forces between the blank and the die.

2. The method according to claim 1, wherein, when manufacturing thin-walled tubular products, the blank is extruded through a die on a movable mandrel provided with a centering head.

3. A method of manufacturing extruded products from difficult-to-work metals and alloys such as high melting-point and chemically active metals and alloys, comprising depositing a metal coating upon a blank of the material to be extruded in a plurality of layers, making the outermost layer porous, the layers being composed of nickel and copper that firmly adhere to each other and to the surface of the blank, positioning the thus treated blank in a container, and introducing a high-pressure fluid into the container to extrude the blank with the coating thereon through a die operably related to the container, with the coating preventing the high-pressure fluid from entering the pores of the blank material and the outermost porous layer ensuring absorption of the high-pressure fluid for decreasing the frictional forces between the blank and the die.

4. The method according to claim 3, wherein, when manufacturing thin-walled tubular products, the extrusion of the blank through a die is effected on a movable mandrel provided with a centering head.

5. A method of manufacturing extruded products from difficult-to-work materials such as high melting-point and chemically active metal, comprising depositing a metal coating upon a blank of the material to be extruded in a plurality of layers, making the outermost layer porous, the layers each being composed of a different metal that firmly adheres to the other metal and to the surface of the blank, depositing a pasty lubricant upon the metal coating, positioning the thus treated blank in a container, and introducing a high-pressure fluid which does not dissolve the lubricant into the container to extrude the thus treated blank through a die operably related to the container, with the coating preventing the high-pressure fluid from entering the pores of the blank material and the outermost porous layer ensuring adsorption of the fluid for decreasing the frictional forces between the blank and the die.

6. The method according to claim 5, wherein, when manufacturing thin-walled tubular products the extrusion of the blank through a die is effected on a movable mandrel provided with a centering head.

7. A method of manufacturing extruded products from difficult-to-work and chemically active metals and alloys, preferably high melting-point and chemically active ones, comprising depositing a metal coating in a plurality of layers on a blank of the material to be extruded, making the outermost layer porous, applying a pasty lubricant onto the coating, positioning the thus treated blank in a container, and introducing a high-pressure fluid which does not dissolve the lubricant into the container to extrude the thus treated blank through a die operably related to the container, with the coating preventing the high-pressure fluid from entering the pores of the blank material and the outermost porous layer ensuring adsorption of the high-pressure fluid for decreasing the frictional forces between the blank and the die.